United States Patent
Schemel

(10) Patent No.: US 6,276,162 B1
(45) Date of Patent: Aug. 21, 2001

(54) PORTABLE COOLER WITH ACCESSORY TRAY

(76) Inventor: Daniel R. Schemel, 102 SW. $2^{nd}$ St. P.O. Box 18, Renville, MN (US) 56284

( * ) Notice: Subject to any disclaimer, the term of this patent is extended or adjusted under 35 U.S.C. 154(b) by 0 days.

(21) Appl. No.: 09/570,781

(22) Filed: May 14, 2000

(51) Int. Cl.[7] ........................................ F25D 3/08
(52) U.S. Cl. ........................ 62/457.2; 62/372; 220/592.01
(58) Field of Search .................................. 62/457.2, 530, 62/457.1, 457.7, 372, 371; 220/592.01, 592.2, 592.11, 62.13

(56) References Cited

U.S. PATENT DOCUMENTS

| | | | |
|---|---|---|---|
| D. 369,525 | 5/1996 | Winters | D7/608 |
| 535,847 | * 3/1895 | Mertz . | |
| 2,781,937 | * 2/1957 | Piker . | |
| 3,255,607 | 6/1966 | Bair et al. | 62/372 |
| 4,741,176 | 5/1988 | Johnson et al. | 62/457 |
| 4,911,295 | * 3/1990 | Venegoni . | |
| 5,341,657 | 8/1994 | Fuller | 62/389 |
| 5,433,085 | 7/1995 | Rogers | 62/372 |
| 5,547,098 | * 8/1996 | Jordan . | |
| 5,934,099 | * 8/1999 | Cook et al. . | |

FOREIGN PATENT DOCUMENTS 0 373 127 A1    11/1988    (SE) .

* cited by examiner

*Primary Examiner*—Henry Bennett
*Assistant Examiner*—Chen-Wen Jiang

(57) ABSTRACT

A cooler is disclosed having a plurality of plate shelves, an accessory tray and a screw on lid with carrying handle. The container is cylindrical in shape and sized to accept a standard nine (9) inch to ten and one-half (10 ½) inch diameter dinner plate in a level, upright position on one or more shelves. The first shelf is the floor of the cooler which has a raised rim along its perimeter for accepting a standard shaped plate with a circular border rim and concave center. The second shelf is comprised of a protruding rim inside the cooler upon which another plate may rest. Alternatively, the accessory tray may rest on the second shelf The accessory tray is molded to fit upon the protruding rim inside the cooler. The accessory tray has compartments for securing cans or bottles containing beverages so that they will not roll about, compartments for silverware and space for additional food items such as condiments. The accessory tray has a handle that extends upward from the center of the tray for lifting of the tray. The underside of the accessory tray has compartments for attachment of a gelpack. The gelpack is secured to the underside of the accessory tray with a twist-on threaded attachment system. Finally, the cooler has a lid with a folding handle. The lid twists on securely to the container. In an alternative embodiment, the cooler has a detachable bottom section secured by threaded attachment to allow carrying of one part of the cooler at a time.

4 Claims, 2 Drawing Sheets

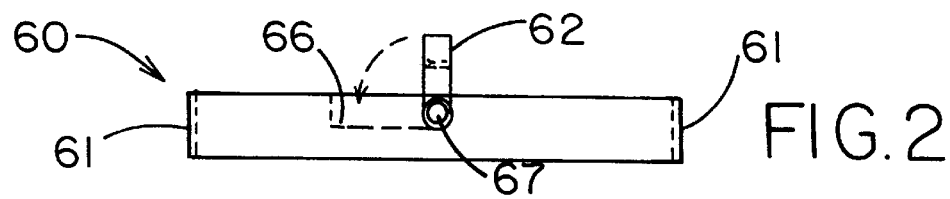
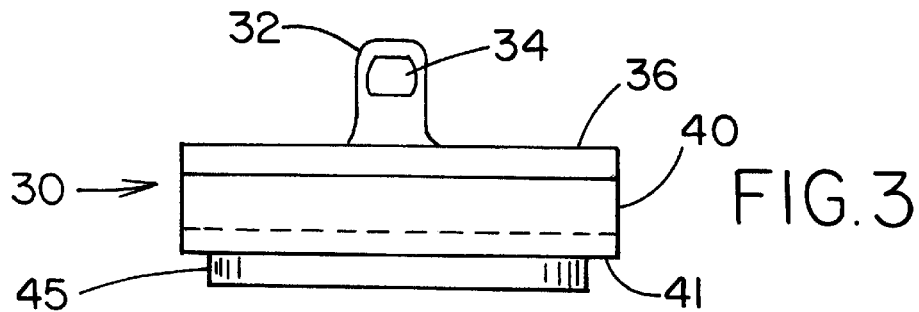
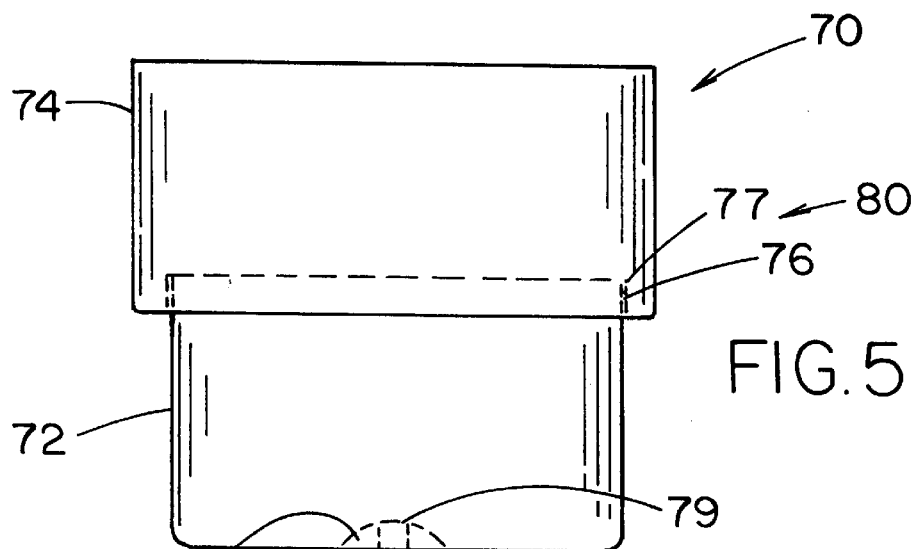
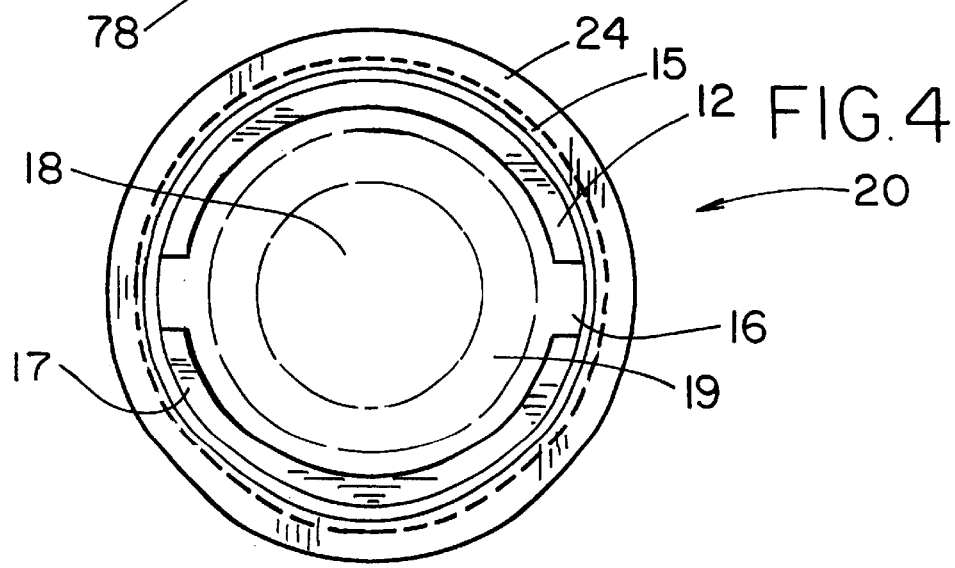

PORTABLE COOLER WITH ACCESSORY TRAY

BACKGROUND OF THE INVENTION

1. Field of the Invention

The present invention relates to an apparatus for portable insulated food and beverage storage and in particular to insulated storage of a plurality of standard plates of food.

2. Description of the Prior Art

Insulated storage containers or "cooolers" are well known in the prior art. U.S. Pat. No. 3,255,607 discloses a portable container with thermally insulated exterior walls. However, the prior art does not address the problem of saving a meal that is on standard sized dishes without having to remove the food and place it in sealable containers. Therefore, a need exists for a cooler shaped and sized to accommodate a standard nine (9) inch to ten and one-half (10½) inch dinner plate. A further need exists for such a cooler that can also carry beverages and accessories. Finally, a need exists for such a cooler that can utilize refreezable gel units for providing low temperature storage.

SUMMARY OF THE INVENTION

The present invention meets the needs and solves the problems identified above by providing an apparatus comprising container having a plurality of plate shelves, an accessory tray and a screw on lid with carrying handle. The container is cylindrical in shape and sized to accept a standard nine (9) inch to ten and one-half (10½) inch diameter dinner plate in a level, upright position on one or more shelves. The first shelf is the floor of the cooler which has a raised rim along its perimeter for accepting a standard shaped plate with a circular border rim and concave center. The second shelf is comprised of a protruding rim inside the cooler upon which another plate may rest. Alternatively, the accessory tray may rest on the second shelf. The accessory tray is molded to fit upon the protruding rim inside the cooler. The accessory tray has compartments for securing cans or bottles containing beverages so that they will not roll about, compartments for eating utensils and space for additional food items such as condiments. The accessory tray has a handle that extends upward from the center of the tray for lifting of the tray. The underside of the accessory tray has compartments for attachment of a gelpack. The gelpack is secured to the underside of the accessory tray with a twist-on threaded attachment system. Finally, the cooler has a lid with a folding handle. The lid twists on securely to the container. In an alternative embodiment, the cooler has a detachable bottom section secured by threaded attachment to allow carrying of one part of the cooler at a time.

The foregoing and other objects, features and advantages of the invention will be apparent from the following more particular description of a preferred embodiment of the invention, as illustrated in the accompanying drawings wherein like reference numbers represent like parts of the invention.

BRIEF DESCRIPTION OF THE DRAWINGS

FIG. 2 is a view of the lid along line 2—2 of FIG. 1.

FIG. 3 is view of the accessory tray along line 3—3 of FIG. 1.

FIG. 4 is view of the accessory tray along line 4—4 of FIG. 1

FIG. 5 is side view of an alternate embodiment of the cooler.

DESCRIPTION OF PREFERRED EMBODIMENTS

Figure 1:
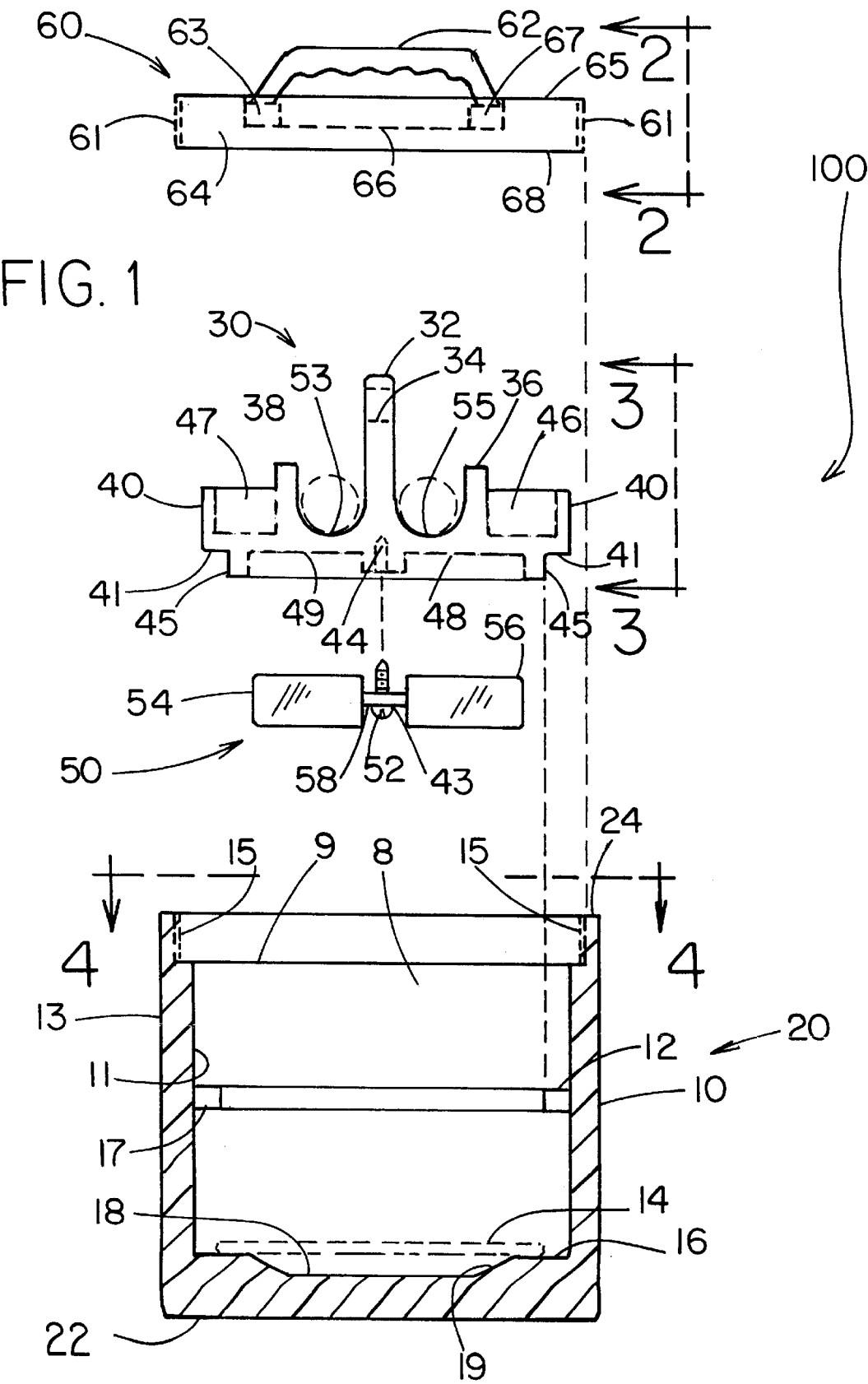
FIG. 1 is an exploded cross sectional view of the cooler.

FIG. 1, depicts cooler 100 having container 20, accessory tray 30 and lid 60.

Container 20 has cylinder 10 with outer wall 13, inner wall 11 and cylinder bottom 22. Compartment 8 has compartment bottom 18, compartment bottom shelf 16, compartment first shelf 12 and compartment second shelf 17. Cylinder 10 has cylinder threads 15 for threaded engagement with lid threads 61. Ledge 9 supports lid 60 when lid 60 has been engaged to cylinder 10 by rotatable engagement of cylinder threads 15 and lid threads 61. Cylinder 10, compartment bottom shelf 16, compartment first shelf 12 and compartment second shelf 17 are sized to accept standard nine (9) inch diameter to ten and one-half (10½) inch diameter dinner plates in a level upright position.

Lid 60 has handle 62 rotatably engaged to first hinge 66 and second hinge 67. Recess compartment 66 in lid 60 provides space for handle 62 to be folded down so that top 65 of lid 60 will have no protrusions above top 65 when handle 62 is folded into recess compartment 66. Lid 60 has lid threads 61 around the circumference of lid 60 for rotatable engagement with cylinder threads 15. Lid bottom 68 rests on ledge 9 when lid 60 is filly engaged with cylinder 10.

Accessory tray 30 has tray handle 32, tray outer wall 42, first compartment 47, second compartment 53, third compartment 55 and fourth compartment 46. First compartment 47 and fourth compartment 46 are adapted for holding eating utensils, condiments or other items. Second compartment 53 and third compartment 55 have rounded bottom sections for accepting beverage containers. Accessory tray 30 has first gelpack compartment 49 and second gelpack compartment 48. First gelpack 54 and second gelpack 56 fit within first gelpack compartment 49 and second gelpack compartment 48 and are connected by gelpack support 58. Gelpack support 58 has securement device hole 43 for receiving securement device 52. Securement device 52 is threaded for threaded engagement with tray securement device cavity 44. In the preferred embodiment, securement device 52 is a twist on plastic bolt.

Accessory tray 30 is circular to fit within cylinder 10 of container 20. Tray edge 41 runs continuously and horizontally around the circumference of tray 30. Tray edge wall 45 runs continuously and vertically around the bottom of tray 30. When positioned inside cylinder 10 of container 20, accessory tray 30 rests on compartment shelf 17 so that handle 32 which is fixed is within cylinder 10.

FIG. 2 depicts lid 60 with handle 62 in the upright position. Handle 62 may be rotated from a vertical position to a horizontal position by rotating handle 62 about second hinge 67 and first hinge 63 (see FIG. 1). When handle 62 is rotated to a horizontal position it rests in recess 66. When needed, handle 62 is rotated from recess 66 to a vertical position. Lid 60 has lid outer surface 64 which is threaded for engagement with cylinder threads 15.

FIG. 3 depicts accessory tray 30 with tray edge 41 and tray edge wall 45.

FIG. 4 depicts container 20 as seen from above. Container 20 has container top 24, cylinder threads 15, compartment first shelf 12 and compartment second shelf 17. Compartment bottom shelf 16 and compartment bottom 18. Compartment slope section 19 connects compartment bottom 18 and compartment shelf 16.

FIG. 5 depicts an alternate embodiment of cooler 100. Container 80 has container top section 74 and container bottom section 72 which are rotatably and threadingly engaged with container bottom section threads 77 and container top section threads 76. Key recess 78 has key cavity 77 for rotating container bottom section 72 for removal or attachment to container top section 74.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

I claim:

1. A cooler comprising:
    a container having a cylinder, a compartment bottom with a shelf and a plurality of compartment shelves;
    a lid removably and rotatably engaged to said container; and
    an accessory tray slidingly engaged in said container.

2. The accessory tray of claim 1 further comprising:
    a gel pack securement device cavity;
    a plurality of compartments;
    a handle fixedly engaged to said tray;
    at least one gel pack compartment;
    a gel pack support; and
    a gel pack securement device.

3. The lid of claim 1 further comprising:
    a recess;
    a handle rotatably engaged to said lid by a plurality of hinges;
    wherein said handle rotates from a vertical position to a horizontal position within said recess.

4. A cooler comprising:
    a container having a cylinder, a compartment bottom with a shelf and a plurality of compartment shelves;
    a lid removably and rotatably engaged to said container, said lid having a recess and a handle rotatably engaged to said lid by a plurality of hinges;
    a tray slidingly and removably engaged in said container having a gel pack securement device cavity, a plurality of compartments, a handle fixedly engaged to said tray, at least one gel pack compartment, a gel pack support; and a gel pack securement device;
    wherein said handle rotates from a vertical position to a horizontal position within said recess.

* * * * *